United States Patent
Coleman et al.

(10) Patent No.: US 10,498,470 B1
(45) Date of Patent: Dec. 3, 2019

(54) RELATIVISTIC WIRELESS CHANNEL EMULATOR

(71) Applicant: The Johns Hopkins University, Baltimore, MD (US)

(72) Inventors: David M. Coleman, Baltimore, MD (US); Daniel W. Chew, Charleston, WV (US); William D. Kight, Jr., Columbia, MD (US); Daniel R. Barcklow, Odenton, MD (US); Stephan D. Frisbie, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 253 days.

(21) Appl. No.: 15/610,652

(22) Filed: Jun. 1, 2017

Related U.S. Application Data

(60) Provisional application No. 62/377,816, filed on Aug. 22, 2016.

(51) Int. Cl.
*H04B 17/30* (2015.01)
*H04B 17/12* (2015.01)
*H04B 7/08* (2006.01)
*H04B 7/06* (2006.01)
*H04W 24/00* (2009.01)
*H04Q 3/38* (2006.01)

(52) U.S. Cl.
CPC .......... *H04B 17/30* (2015.01); *H04B 7/0617* (2013.01); *H04B 7/086* (2013.01); *H04B 17/12* (2015.01); *H04Q 3/38* (2013.01); *H04W 24/00* (2013.01)

(58) Field of Classification Search
CPC ...... H04B 7/0617; H04B 17/12; H04B 7/086; H04B 17/30; H01Q 3/38; H04W 24/00; H04Q 7/24
See application file for complete search history.

(56) References Cited

U.S. PATENT DOCUMENTS

| | | | |
|---|---|---|---|
| 6,288,794 B1* | 9/2001 | Honary | G06T 3/40 358/1.1 |
| 7,075,893 B1* | 7/2006 | Mlinarsky | H04L 41/145 370/241 |
| 7,864,080 B1* | 1/2011 | Demirsoy | H03H 17/0685 341/61 |
| 2007/0064923 A1* | 3/2007 | Schmukler | H03H 11/265 379/406.1 |
| 2011/0306306 A1* | 12/2011 | Reed | H04B 17/0085 455/67.11 |
| 2019/0089434 A1* | 3/2019 | Rainish | H01Q 3/38 |

\* cited by examiner

*Primary Examiner* — Dong-Chang Shiue
(74) *Attorney, Agent, or Firm* — Noah J. Hayward

(57) ABSTRACT

A channel propagation emulator includes a radio peripheral configured to receive input radio frequency (RF) data and modify the input RF data according to channel effects including signal delay, propagation loss and Doppler shift effect to generate an RF output, and a host device operably coupled to the radio peripheral. The RF output represents a modification of the input RF data based on a propagation model. The host device operably coupled to an external controller and is configured to define emulation parameters based on the propagation model. The propagation model is selected at the external controller. The external controller is configured to provide instructions for implementing the Doppler shift effect to include spreading that is multiplicative in frequency.

20 Claims, 7 Drawing Sheets

RELATIVISTIC WIRELESS CHANNEL EMULATOR

CROSS-REFERENCE TO RELATED APPLICATION

This application claims priority to and the benefit of prior-filed U.S. Provisional Application No. 62/377,816, filed Aug. 22, 2016, the content of which is herein incorporated by reference in its entirety.

STATEMENT OF GOVERNMENTAL INTEREST

This invention was made with Government support under contract number N00024-13-D-6400 awarded by the Naval Sea Systems Command (NAVSEA). The Government has certain rights in the invention.

BACKGROUND

Wireless communications networks and the devices that operate therein have become ubiquitous in modern society. These devices allow users to maintain a nearly continuous level of connectivity to the Internet and other devices/networks. Meanwhile, there are continuous desires to improve the performance of wireless communication devices in various different environments.

In a typical situation, wireless communications equipment (e.g., transmitters and receivers) may be designed for a particular context and then tested in the various environmental conditions that may be encountered within that context. Adjustments may then be made based on the performance of the equipment and further testing may continue until equipment design features can be settled to optimize performance in the context and all conditions that may be encountered therein.

However, some contexts in which wireless communications equipment may be planned for use are extremely remote, hostile, or otherwise may be extremely costly to conduct testing within. When this is the case, having a channel emulator that can model and emulate propagation between the transmitter and receiver may be extremely useful in keeping costs manageable. However, if the channel emulator is not accurate, the benefit otherwise expected may not be so easy to achieve.

Accordingly, a need may exist to develop less channel emulation capabilities that are flexible and scalable. Moreover, to the extent that a solution could be found that is flexible, modular and scalable, significant value could be achieved.

BRIEF SUMMARY OF SOME EXAMPLES

In an example embodiment, a channel propagation emulator is provided. The channel propagation emulator may include a radio peripheral configured to receive input radio frequency (RF) data and modify the input RF data according to channel effects including signal delay, propagation loss and Doppler shift effect to generate an RF output, and a host device operably coupled to the radio peripheral. The RF output represents a modification of the input RF data based on a propagation model. The host device operably coupled to an external controller and is configured to define emulation parameters based on the propagation model. The propagation model is selected at the external controller. The external controller is configured to provide instructions for implementing the Doppler shift effect to include spreading that is multiplicative in frequency.

In another example embodiment, a method for emulating channel propagation with separation between a propagation model and hardware performing emulation is provided. The method may include determining a propagation model based on a user selection made at an external controller, determining emulation parameters based on the propagation model at a host device in communication with the external controller, configuring a radio peripheral with the emulation parameters determined at the host device, receiving input radio frequency (RF) data at the radio peripheral, and modifying the input RF data according to channel effects including signal delay, propagation loss and Doppler shift effect to generate an RF output representing a modification of the input RF data based on the propagation model. The Doppler shift effect includes spreading that is multiplicative in frequency.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale.

DETAILED DESCRIPTION

Figure 1:
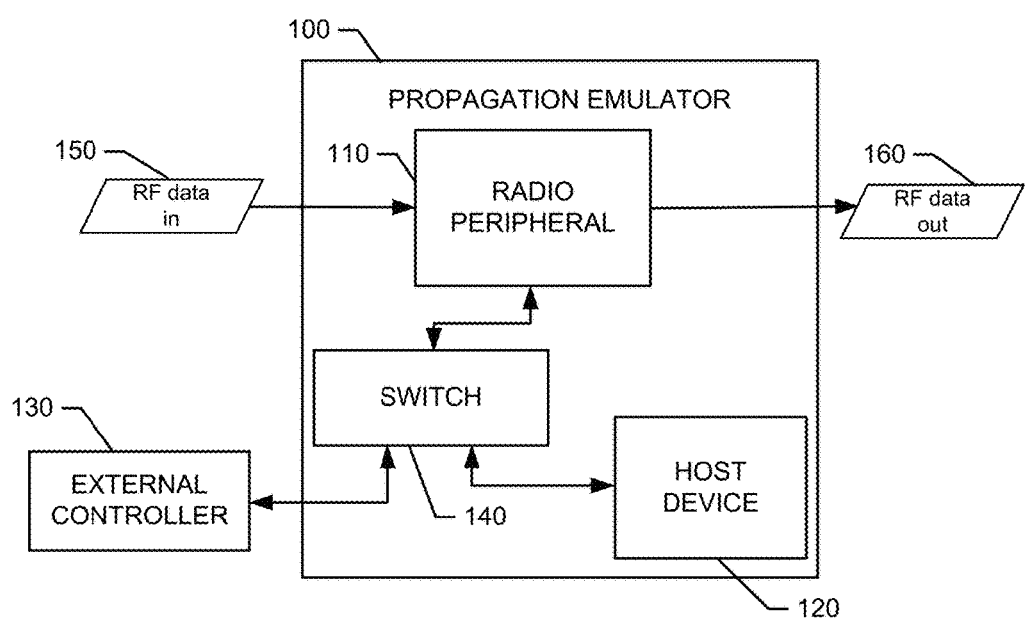
FIG. 1 illustrates a block diagram of a channel propagation emulator in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

As used in herein, the terms "component," "module," and the like are intended to include a computer-related entity, such as but not limited to hardware, firmware, or a combination of hardware and software (i.e., hardware being configured in a particular way by software being executed thereon). For example, a component or module may be, but is not limited to being, a process running on a processor, a processor (or processors), an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Doppler shift can be experienced in both non-relativistic and relativistic settings. Relativistic Doppler shift is the apparent change in frequency of a signal caused by contractions and dilations of time when the transmitter and receiver exhibit relative motion. By many, the Doppler shift is viewed simply as a shift in frequency based on relative motion between the transmitter and receiver. However, for communication systems engineering, it is helpful to also view the Doppler effect as a channel effect that transforms an input signal.

The frequency change due to the Doppler shift is recognized in literature as a multiplicative effect induced by the dilation of time as a function of relative velocity. The effect is typically modeled and approximated by a single additive frequency shift. This approximation is commonly referred to as a narrowband approximation and is most accurate when the input is a single frequency. The narrowband approximation is useful for when the necessary conditions are met. However, if the unit under test begins to deviate from the necessary conditions, error in the approximation may increase.

The multiplicative frequency shift that is caused by the Doppler shift cannot be approximated by an additive change applied uniformly to all frequencies when working within an environment where special relativity is applied (e.g., at high velocity) and/or for wideband communication systems. If one tries to apply the approximation with the wrong setting, the error or approximation will be substantial.

To demonstrate how a wideband signal may require a better approach to Doppler effect emulation, consider a signal of interest with a bandwidth of 20 MHz, centered around 800 MHz, and the receiver is kept to a velocity of 100 m/sec. In such a scenario, the relativistic Doppler shift would be a multiplicative effect shrinking the entire bandwidth and center frequency by a scalar value. In contrast, by using an additive emulation of the Doppler shift, the center frequency of the signal would be shifted by 266.67 Hz leaving the bandwidth unchanged. This would result in an error of 3.33 Hz at the edges of the bandwidth.

The Doppler effect changes not only the center frequency, but also the bandwidth of the signal itself. The symbol rate of the modulation will appear to decrease as radial velocity away from the observer increases. The effect of this change to the symbol rate as an error in the sampling phase at the receiver is cumulative over time. This ultimately means that channel emulators that represent Doppler shift through additive frequency shifts (instead of multiplicative frequency shifts) would become erroneous once relativistic effects or wide band signals are introduced into the test environment.

If modeling and propagation emulation are performed using the additive frequency shifts for pieces of equipment that will ultimately be expected to travel at very high speeds, it may be impossible to close links between transmitters and receivers. If it is expensive to test in the high speed environment, then it may not be possible to accurately model effects and test equipment before the equipment is placed in the high speed environment. Accordingly, example embodiments may allow the multiplicative effects of Doppler shift to be accurately modeled so that testing can be completed accurately before deployment of equipment occurs.

Some example embodiments described herein provide an implementation-independent wireless channel emulation platform in the form of a channel propagation emulator that separates the propagation model from the emulator hardware. This separation establishes a hardware-independent framework for wireless channel emulation capable of running many different propagation models and channel effects. Moreover, example embodiments may provide a relatively low-cost wireless channel emulator that is both highly modular and scalable. The channel propagation emulator may be configured to implement path loss, propagation delay and relativistic Doppler spreading that is multiplicative in frequency, as opposed to being additive in frequency like conventional emulators.

FIG. 1 illustrates a block diagram of a channel propagation emulator 100 in accordance with an example embodiment. The channel propagation emulator 100 may include a radio peripheral 110 (e.g., a universal serial radio peripheral (USRP)) and a host device 120. The channel propagation emulator 100 may operate under the control of an external controller 130. In some cases, the radio peripheral 110 may be operably coupled to the host device 120 and/or the external controller 130 via a switch 140. However, in other examples, the external controller 130 may be directly connected to the host device 120, which may in turn be directly connected to the radio peripheral 110.

Input radio frequency (RF) data (e.g., RF data in 150) may be provided to the channel propagation emulator 100 via RF ports of the radio peripheral 110. The channel propagation emulator 100 may then modify the RF data in 150 in accordance with the characteristics/parameters provided for the environment that is to be emulated. As a result, output RF data (e.g., RF data out 160) may be generated by the channel propagation emulator 100. The RF data out 160 represents the data that would be experienced after passing through a medium having the channel effects modeled or emulated by the channel propagation emulator 100. Channel emulation parameters may be provided to the channel propagation emulator 100 by the external controller 130.

The external controller 130 is, as can be appreciated from FIG. 1, separated from the hardware used for the channel propagation emulator 100. Accordingly, the external controller 130 is essentially hardware agnostic. This is unlike conventional emulators, which typically merge channel simulation software and the hardware of the channel emulator. Another difference that the external controller 130 provides relative to conventional emulators is that the external controller 130 enables the channel propagation emulator 100 to provide relativistic Doppler shift by implementing the Doppler shift with a multiplicative effect on frequency rather than the additive effect that is provided normally.

Figure 2:
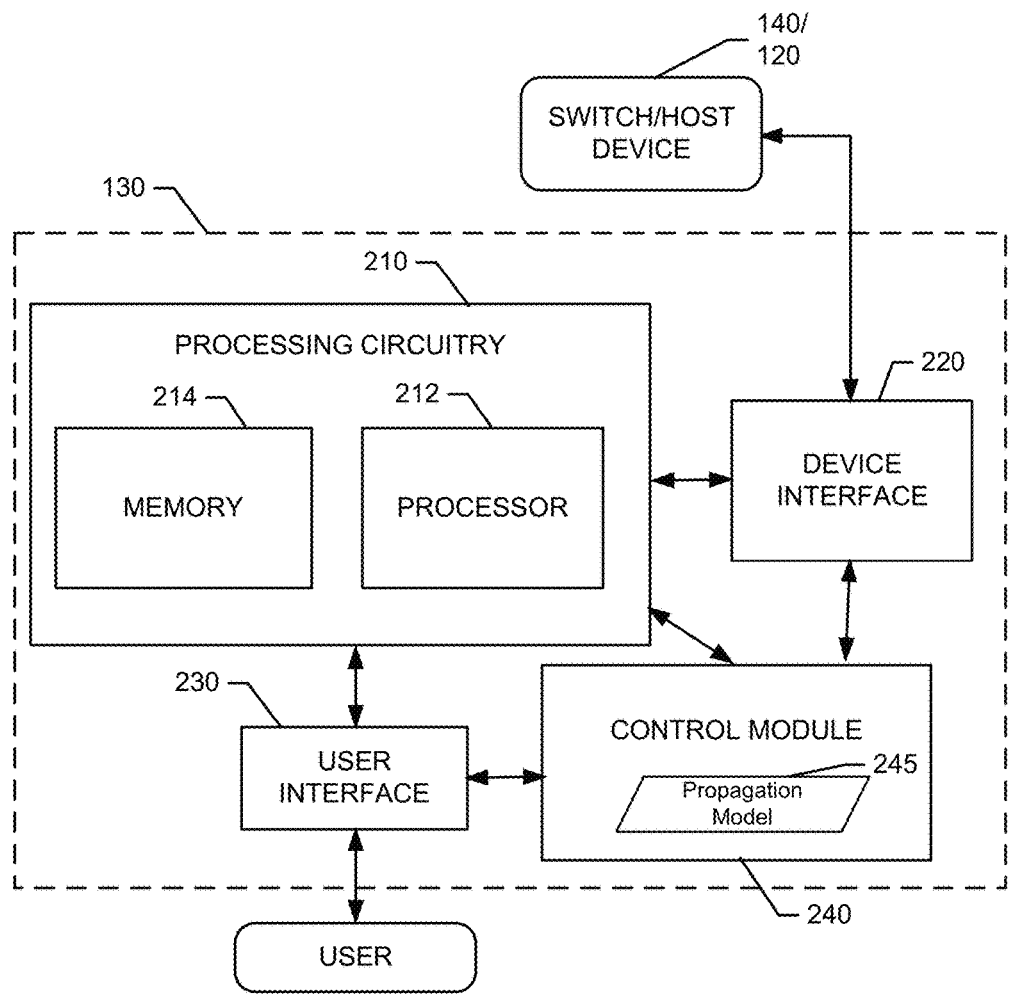
FIG. 2 illustrates a block diagram of an example structure for embodying an external controller in accordance with an example embodiment.

FIG. 2 illustrates a block diagram of example structure for embodying the external controller 130 in accordance with an example embodiment. In this regard, for example, the external controller 130 may include processing circuitry 210 that may be configurable to perform data processing functions in accordance with example embodiments. The processing circuitry 210 may be configured to interface with the host device 120 and/or the radio peripheral 110 to control the operation thereof in accordance with example embodiments. The processing circuitry 210 may therefore be configured to perform data processing, control function execution and/or other processing and management services according to an example embodiment of the present invention.

In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an example embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display, touchscreen interface, keyboard, mouse, speakers, and/or other input/output mechanisms.

The device interface 220 may include one or more interface mechanisms for enabling communication with other devices or components (e.g., internal and/or external devices or network components). In some cases, the device interface 220 may be any means such as a device or circuitry embodied in either hardware, or a combination of hardware and software that is configured to receive and/or transmit data from/to components or devices in communication with the processing circuitry 210. Thus, for example, the device interface 220 may provide interfaces for communication via different communication links (e.g., Ethernet and/or the like).

The processor 212 may be embodied in a number of different ways. For example, the processor 212 may be embodied as one or multiple instances of various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry— in the form of processing circuitry 210) capable of performing operations according to example embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of a control module 240 based on inputs received by the processing circuitry 210. As such, in some embodiments, the processor 212 (or the processing circuitry 210) may be said to cause each of the operations described in connection with the control module 240 in relation to operation of the control module 240 to undertake the corresponding functionalities responsive to execution of instructions or algorithms configuring the processor 212 (or processing circuitry 210) accordingly. The control module 240 may, in some cases, be embodied as, include or otherwise control the host device 120 and/or the radio peripheral 110 in the manner described herein. As such, in some example embodiments, the control module 240 may be configured to perform a plurality of processing functions related to defining emulation parameters to emulate a wireless communication channel having desired characteristics. Among the processing functions that the control module 240 may be configured to perform, at least one such function may be the formulation of instructions or an instruction set for determination of modeling parameters to be generated for a particular context or environment selected by a user. In some cases, a library of selectable environments or contexts to be modeled may be accessed for the determination. After selection of a particular environment or context, the corresponding information identifying such environment or context may be utilized to generate instructions for parameters to be used to modify an incoming RF signal (e.g., at the radio peripheral 110) prior to outputting a signal representing an outgoing RF signal that would be experienced after passage of the incoming RF signal through the particular environment or context that was selected. As such, for example, the control module 240 may be configured to enable the selection of a propagation model 245 that ultimately enables the channel propagation emulator 100 to modify the incoming RF signal according to channel effects including signal delay, propagation loss and Doppler shift effect to generate an RF output that is a modification of the input RF data based on the propagation model 245. In particular, as described in greater detail below, the modification of the RF signal will ultimately be provided (by hardware in the form of the radio peripheral 110) to implement the Doppler shift effect to include spreading that is multiplicative in frequency. Thus, the control module 240 may act as an emulator modeling module.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets associated with parameter generation for modeling various environments or contexts. Among the contents of the memory 214, applications may be stored for execution by the processor 212 in order to carry out the functionality associated with each respective application. In some cases, the applications may include instructions for generation of channel parameters to be modeled in accordance with example embodiments. The parameters, instructions or other data stored may be stored in the form of library or other such entries.

Figure 3:
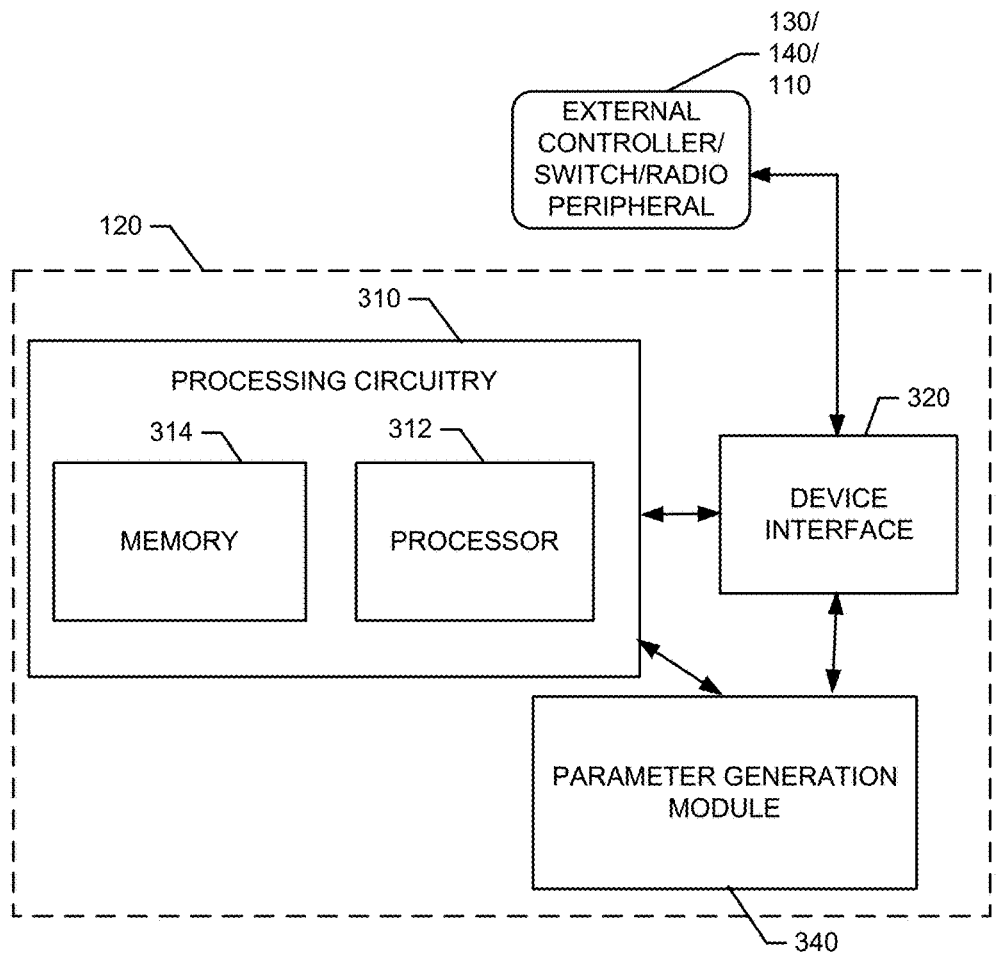
FIG. 3 illustrates a block diagram of an example structure for embodying a host device in accordance with an example embodiment.

Under the control of the processing circuitry 210, or by virtue of the operation of the processing circuitry 210, the control module 240 may issue instructions that can be provided to the host device 120 (e.g., directly or via the switch 140) to direct the host device relative to generation of parameters modeling channel conditions that are to be emulated by the channel propagation emulator 100. FIG. 3 illustrates a block diagram of example structure for embodying the host device 120 in accordance with an example embodiment. In this regard, for example, the host device 120 may include processing circuitry 310 that may be configurable to perform data processing functions in accordance with example embodiments. The processing circuitry 310 may be configured to interface with the switch 140, the external controller 130 and/or the radio peripheral 110 to control the operation thereof in accordance with example embodiments. The processing circuitry 310 may therefore be configured to perform data processing, control function execution and/or other processing and management services according to an example embodiment of the present invention.

In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320. As such, the processing circuitry 310 may be embodied as a circuit chip (e.g., an integrated circuit chip) configured (e.g., with hardware, software or a combination of hardware and software) to perform operations described herein. The processor 312, memory 314, and device interface 320 may be similar in capability and in some cases also structure (e.g., except for differences in scale or programming) to the processor 212, memory 214, and device interface 220 described above in reference to the example of FIG. 2.

In an example embodiment, the processor 312 (or the processing circuitry 310) may be embodied as, include or otherwise control the operation of a parameter generation module 340 based on inputs received by the processing circuitry 310. As such, in some embodiments, the processor 312 (or the processing circuitry 310) may be said to cause each of the operations described in connection with the parameter generation module 340 in relation to operation of the parameter generation module 340 to undertake the corresponding functionalities responsive to execution of instructions or algorithms configuring the processor 312 (or processing circuitry 310) accordingly. The parameter generation module 340 may, in some cases, be embodied as, include or otherwise control the configuration of the radio peripheral 110 to model or emulate desired channel conditions in the manner described herein. As such, in some example embodiments, the parameter generation module 340 may be configured to perform a plurality of processing functions related to generating emulation parameters to emulate a wireless communication channel having desired characteristics based on instructions received from the external controller 130. Among the processing functions that the parameter generation module 340 may be configured to perform, at least one such function may be the generation of emulation parameters that control initiation of delay functions and sampling functions that facilitate modeling of propagation delay and also facilitate the modeling of Doppler spreading that is multiplicative in frequency instead of additive in frequency. These functions, although instructed at the host device 120, will be executed on hardware at the radio peripheral 110. In this regard, the host device 120 hosts software configured to take instruction from the external controller 130 for execution in hardware at the radio peripheral 110 (thereby separating the hardware from the model) to generate modeling that accounts accurately for relativistic effects (e.g., Doppler shift and time dilation). The parameter generation module 340 therefore provides the parameters for use at the radio peripheral 110 to execute instructions associated with the propagation model 245 that can be executed in real time on a waveform (e.g., incoming RF) to provide a complete representation of Doppler effects including both relativistic time dilation and frequency shifting.

Figure 4:
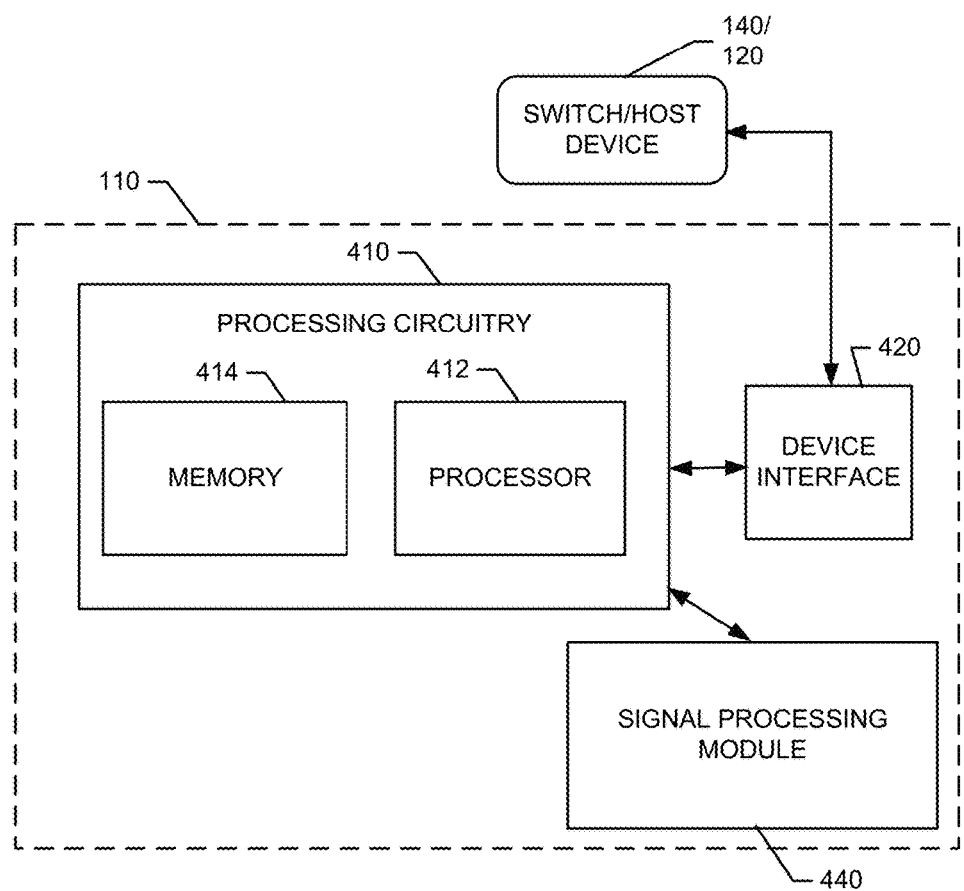
FIG. 4 illustrates a block diagram of an example structure for embodying a radio peripheral in accordance with an example embodiment.

FIG. 4 illustrates a block diagram of example structure for embodying the radio peripheral 110 in accordance with an example embodiment. In this regard, for example, the radio peripheral 110 may include processing circuitry 410 that may be configurable to perform data processing functions in accordance with example embodiments. The processing circuitry 410 may be configured to interface with the switch 140 and/or the radio peripheral 110 to control the operation thereof in accordance with example embodiments. The processing circuitry 410 may therefore be configured to perform data processing, control function execution and/or other processing and management services according to an example embodiment of the present invention.

In some embodiments, the processing circuitry 410 may include one or more instances of a processor 412 and memory 414 that may be in communication with or otherwise control a device interface 420. As such, the processing circuitry 410 may be embodied as a circuit chip (e.g., an integrated circuit chip) configured (e.g., with hardware, software or a combination of hardware and software) to perform operations described herein. The processor 412, memory 414, and device interface 420 may be similar in capability and in some cases also structure (e.g., except for differences in scale or programming) to the processor 212, memory 214, and device interface 220 described above in reference to the example of FIG. 2. In an example embodiment, the processing circuitry 410 may include or be embodied as an FPGA. Moreover, in some cases, the radio peripheral 110 may be embodied as a USRP such as, for example, an Ettus X310 USRP that may interface with a software defined radio (SDR) implemented at the host device 120. The SDR may employ a GNU radio framework.

In an example embodiment, the processor 412 (or the processing circuitry 410) may be embodied as, include or otherwise control the operation of a signal processing module 440 based on inputs received by the processing circuitry 410. As such, in some embodiments, the processor 412 (or the processing circuitry 410) may be said to cause each of the operations described in connection with the signal processing module 440 in relation to operation of the signal processing module 440 to undertake the corresponding functionalities responsive to execution of instructions or algorithms configuring the processor 412 (or processing circuitry 410) accordingly. The signal processing module 440 may, in some cases, be configured to perform the channel propagation emulation as described herein based on its interaction with the host device 120. The channel propagation emulator 100 therefore provides a framework that essentially acts as a buffer management system between different components and also interfaces to radio platforms external to the host device 120 while enabling access to a library of open source signal processing blocks that can be cascaded into a flowgraph. The flowgraph may be an organization of the functional components (e.g., software components) that provide modulation and demodulation. As such, the host device 120 may be configured to receive baseband data from the radio peripheral 110 and process the data in accordance with the flowgraph.

Figure 5:
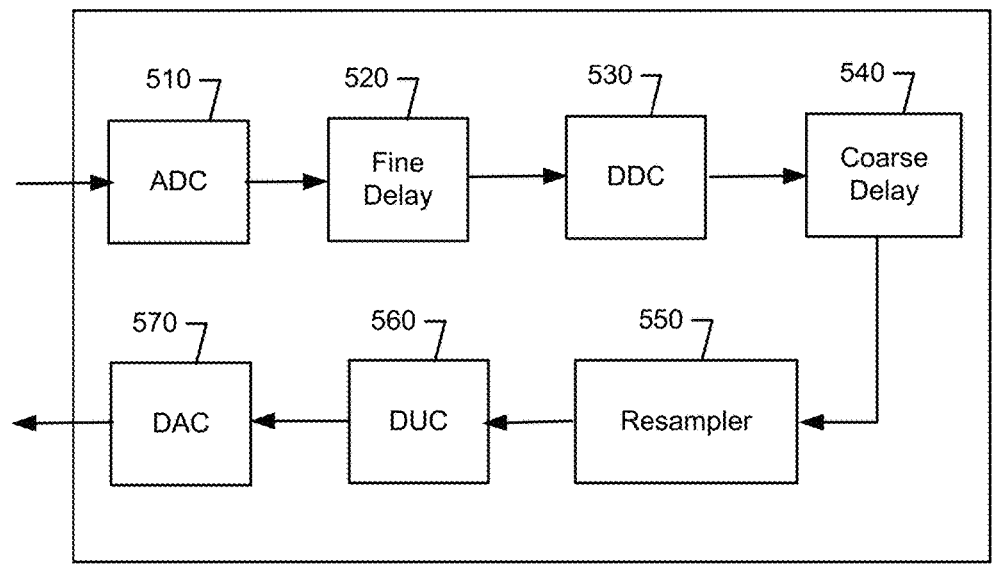
FIG. 5 illustrates a block diagram of a flowgraph for the data path in accordance with an example embodiment.

FIG. 5 illustrates a block diagram of the flowgraph implemented in accordance with an example embodiment. It should be appreciated that the flowgraph can operate in either direction. The direction shown is for receive signals, but the direction could be reversed for transmit signals. Path loss is controlled by variable gain settings of transmit and receive front ends. The channel propagation emulator 100 may be configured to implement these variable gain settings in a way that minimizes quantization noise of the system via, for example, 32 bit registers that are controlled from GNURadio methods "set_rx_gain" and "set_tx_gain". When the external controller 130 sets the path loss parameter, the values of the analog gain control registers may be decreased. This may result in a lower power in the output signal. First, the gain of the transmit gain may be reduced, and only when the gain reaches zero may the receive gain be reduced. This may reduce the gain and minimize quantization noise.

As shown in FIG. 5, RF data may initially be received at an analog to digital converter (ADC) 510, which may be disposed at the radio peripheral 110. The ADC 510 may convert the analog signal to a corresponding digital representation thereof. The digital representation may then be processed with a fine delay module 520 implemented using a circular buffer. The circular buffer may have a variable length (e.g., 10 bits wide (1024 samples)) and be controlled by a fine delay register. The fine delay module 520 may therefore be capable of adding, for example, up to 5.12 microseconds of delay in 5 nanosecond increments to the inputted signal.

An output of the fine delay module 520 may then be provided to a digital downconverter (DDC) 530. The DDC 530 may then provide an output to a coarse delay module 540 that may also be implemented using a circular buffer. In some examples, the coarse delay module 540 may be configured to implement a variable delay, and may be controlled by a coarse delay register. The coarse delay module 540 may therefore be capable of adding, for example, up to 512 microseconds of delay in 250 nanosecond increments to the inputted signal. An amount of inputted delay to be modeled may be provided in nanoseconds or microseconds that is between, for example, 0 and 517 microseconds.

After downconversion and delay have been implemented to model the effects of propagation delay and propagation loss, the effects of Doppler spread may be emulated using a resampler 550. The resampler 550 may be implemented, for example, with a Farrow filter and a hold, increment, skip (HISK) module. The HISK module may be configured to accommodate the portion of sampling delay that is an integer multiple of the sample period and the Farrow filter may account for any remaining fractional delay.

To allow for integer sample delays, the HISK module may store all incoming samples in a FIFO and maintain a sample buffer which is fed by the FIFO. At every sample strobe, the sample buffer may shift in 0, 1 or 2 samples from the FIFO. The decision of how many samples to consume from the FIFO may be determined by an accumulator block. At every sample strobe, the accumulator may add a value of the output buffer length minus the input buffer length to an accumulation register. If the accumulation register surpasses the output frame length, the FIFO will consume 2 samples. If the accumulation register is in between 0 and the output buffer length, the FIFO will consume 1 sample. If the accumulation register becomes negative, the FIFO will consume 0 samples. The accumulation block may wire the ratio of the accumulation register to the output buffer length into the delay parameter of the Farrow filter. The output of the resampler 550 may then be provided to another circular buffer, which may take samples out at a rate of the sample strobe. The resampler 550 provides a multiplicative effect to all frequencies.

Figure 6:
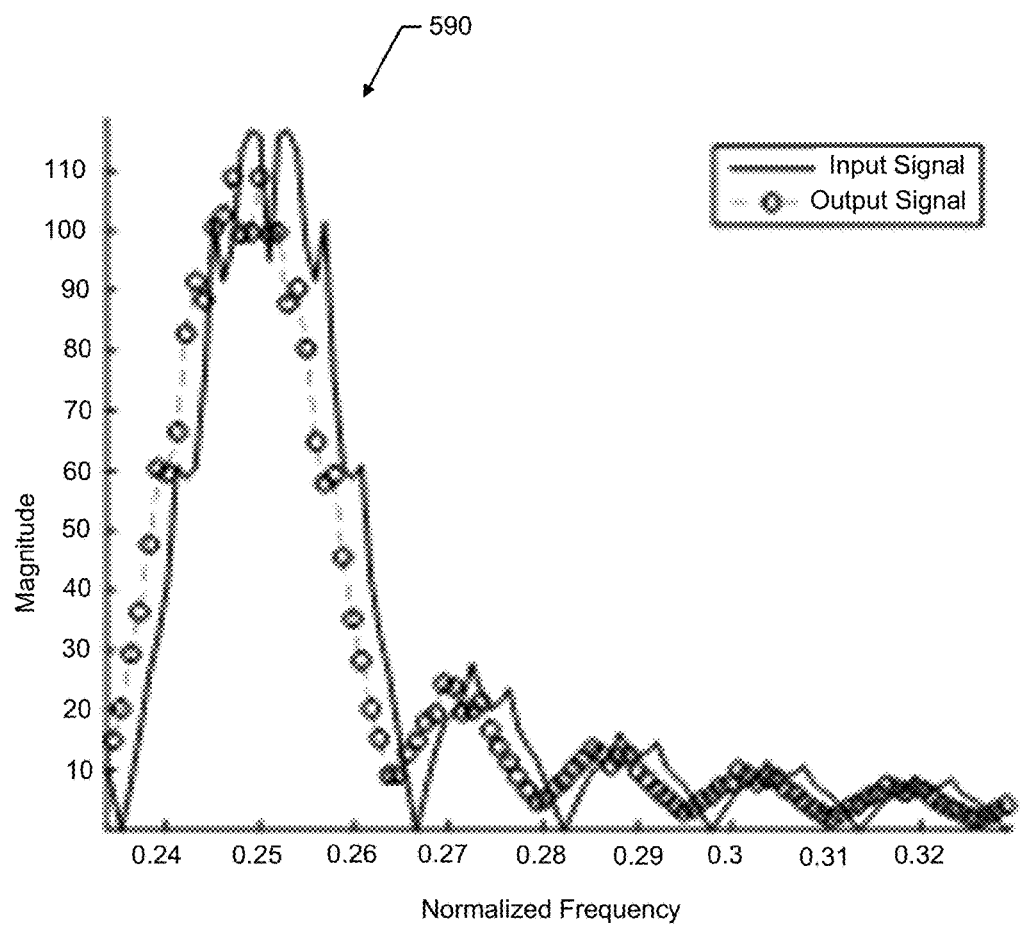
FIG. 6 illustrates time dilation as an output of a Farrow resampler in accordance with an example embodiment.

In particular, the resampler 550 is configured to realize the Doppler effect by interpolating or decimating an input signal while maintaining a constant sampling rate. This is equivalent to time dilation in the digital domain, which is shown in the plot 590 of time dilation as the output of the resampler 550 of FIG. 6. The resampler 550 may be configured to employ an input buffer and an output buffer of equal lengths. The delays described above are then used to initiate fractional delays that convert the input into a time-dilated version in the output buffer. By producing and consuming samples at the sample rate, the frequency components of the output will be that of the input multiplied by the ratio of the output buffer length to the input buffer length. Because the two rates are the same, there will be some residue left in the output buffer and the residue will grow over time. Effectively, the resampler 550 produces more samples than can be consumed. This adds delay and models delay to change bandwidth compression. Under normal circumstances, a resampler would be used to increase the sample rate. However, the resampler 550 is configured to let the amount of delay grow or shrink to emulate distance between the sender and the receiver. An output of the resampler 550 may be provided to a digital upconverter (DUC) 560. The DUC 560 may upconvert and upsample the signal and drive a digital-to-analog (DAC) 570. The DAC 560 may then output an analog signal showing the channel effects being emulated by the channel propagation emulator 100.

Gain through the flowgraph may be normalized such that system gain has a unity gain when the path loss is set to 0 dB. The analog front end, ADC 510 and DAC 570, each inflict some small signal latency on the system. The digital processing also inflicts latency on the system. This may cause an inadvertent phase shift in the output signal. The received signal may be down converted to a baseband signal. That complex-valued baseband signal may then be delayed through processing by a given amount of time. The delayed signal may then be upconverted by the same carrier frequency used for downconversion. Thus, a phase shift may be imposed on the signal to define an offset as a function of the center frequency of the tuning and delay-time of the latency plus processing.

Example embodiments may therefore prevent the erroneous emulation that may occur for wideband signals or situations where relativistic effects are introduced. Example embodiments may therefore support a wider range of scenarios and even support multi-path environments (e.g., via parallel processing and/or cascaded systems). Scalability is therefore easily achievable using example embodiments. Furthermore, the radio peripheral 110 is configured to handle all flows associated with the data path (thereby removing the host device 120 from the data path), while the host device 120 remains involved only in the control path.

Figure 7:
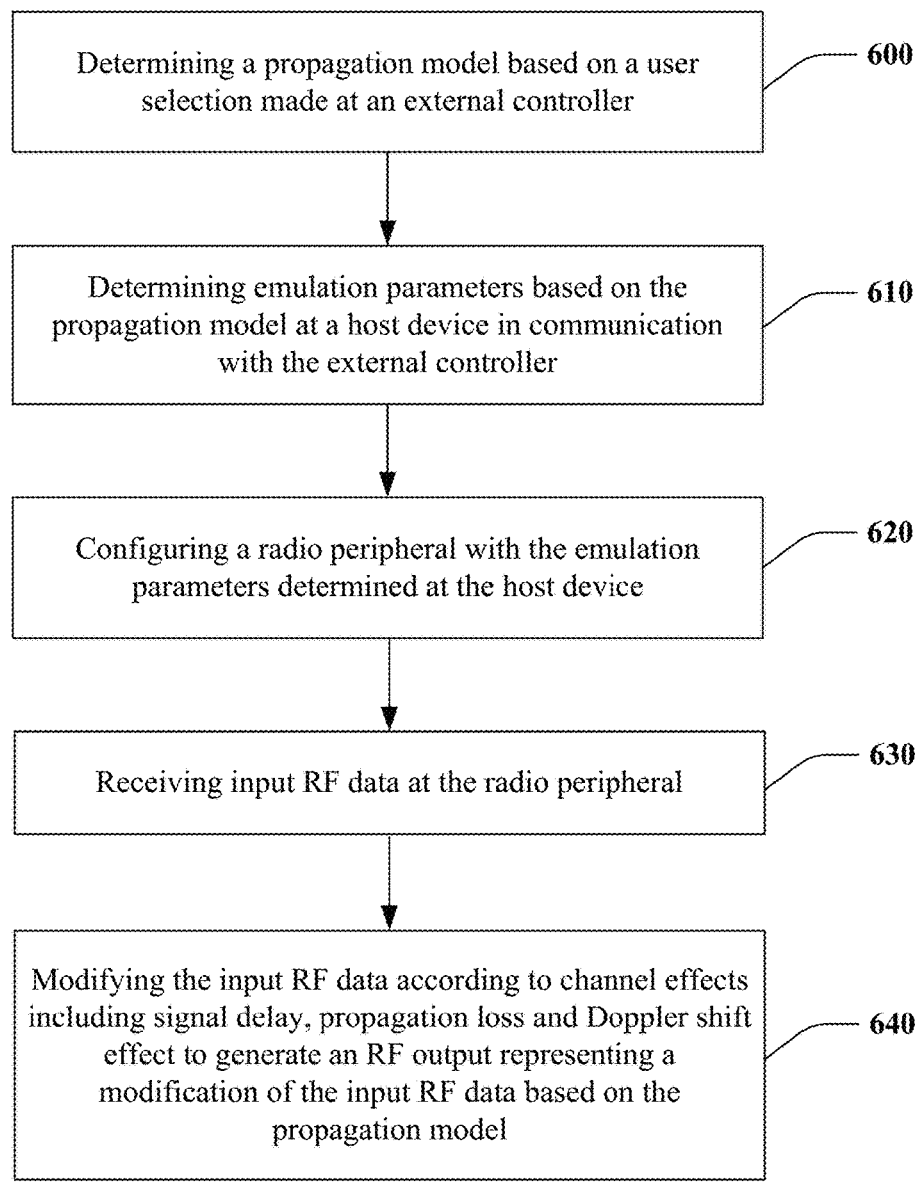
FIG. 7 illustrates a block diagram of a method in accordance with an example embodiment.

As such, the channel propagation emulator 100 of FIG. 1 may provide an environment in which a mechanism via which a number of useful methods may be practiced. FIG. 7 illustrates a block diagram of one method that may be associated with the channel propagation emulator 100 of FIG. 1. From a technical perspective, the channel propagation emulator 100 described above may be used to support some or all of the operations described in FIG. 7. As such, the platform described in FIG. 1 may be used to facilitate the implementation of several computer program and/or network communication based interactions. As an example, FIG. 7 is a flowchart of a method and program product according to an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., of the channel propagation emulator 100) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method for emulating channel propagation with separation between a propagation model and hardware performing emulation is provided. The method may include determining a propagation model based on a user selection made at an external controller at operation 600, determining emulation parameters based on the propagation model at a host device in communication with the external controller at operation 610, configuring a radio peripheral with the emulation parameters determined at the host device at operation 620, receiving input RF data at the radio peripheral at operation 630, and modifying the input RF data according to channel effects including signal delay, propagation loss and Doppler shift effect to generate an RF output representing a modification of the input RF data based on the propagation model at operation 640. The Doppler shift effect includes spreading that is multiplicative in frequency.

In some embodiments, the method (and a corresponding apparatus configured to perform the method) may include (or be configured to perform) additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, the method may further include determining a plurality of propagation models each corresponding to a different path to model a multipath scenario. In some cases, the different propagation models may be processed in parallel or in a cascaded fashion with corresponding signal processing modules. In an example embodiment, the radio peripheral may include a resampler, and configuring the radio peripheral may include configuring the resampler to implement a delay to model bandwidth compression associated with relativistic Doppler shift effects to implement the Doppler shift effect to include spreading that is multiplicative in frequency. In some cases, the resampler may be configured to produce and consume samples at the sample rate such that a number of samples produced is larger than a number of samples consumed to implement the delay. In an example embodiment, the resampler may be configured to employ time dilation of the input RF data in the digital domain. In an example embodiment, the resampler may be configured to generate an output having frequency components that are equal to frequency components of an input thereof multiplied by a ratio between output buffer length and input buffer length. In some cases, the resampler includes a Farrow filter.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A channel propagation emulator comprising:
   a radio peripheral configured to receive input radio frequency (RF) data and modify the input RF data according to channel effects including signal delay, propagation loss and Doppler shift effect to generate an RF output, the RF output representing a modification of the input RF data based on a propagation model; and
   a host device operably coupled to the radio peripheral and an external controller, the host device being configured to define emulation parameters based on the propagation model, the propagation model being selected at the external controller,
   wherein the external controller is configured to provide instructions for implementing the Doppler shift effect to include spreading that is multiplicative in frequency.

2. The channel propagation emulator of claim 1, wherein the radio peripheral comprises hardware for defining the channel effects, and the external controller comprises an emulator modeling module selection of the propagation model to make the hardware independent of the propagation model.

3. The channel propagation emulator of claim 1, wherein the radio peripheral comprises a signal processing module configured to define the channel effects in accordance with the emulation parameters defined by the host device.

4. The channel propagation emulator of claim 3, further comprising a plurality of signal processors cascaded or operated in parallel to model multiple signal paths.

5. The channel propagation emulator of claim 1, wherein the radio peripheral comprises a resampler, and wherein the resampler is configured to implement a delay to model bandwidth compression associated with relativistic Doppler shift effects to implement the Doppler shift effect to include spreading that is multiplicative in frequency.

6. The channel propagation emulator of claim 5, wherein the resampler is configured to produce and consume samples at the sample rate such that a number of samples produced is larger than a number of samples consumed to implement the delay.

7. The channel propagation emulator of claim 5, wherein the resampler includes a Farrow filter.

8. The channel propagation emulator of claim 5, wherein the radio peripheral converts the input RF data to a digital domain, and wherein the resampler is configured to employ time dilation of the input RF data in the digital domain.

9. The channel propagation emulator of claim 8, wherein the radio peripheral comprises a delay module and a digital downconverter operably coupled to the resampler, and wherein an output of the resampler is digitally upconverted before conversion out of the digital domain into the RF output.

10. The channel propagation emulator of claim 9, wherein the delay module comprises a coarse delay module and a fine delay module.

11. The channel propagation emulator of claim 5, wherein the resampler is configured to generate an output having frequency components that are equal to frequency components of an input thereof multiplied by a ratio between output buffer length and input buffer length.

12. The channel propagation emulator of claim 1, wherein the coarse delay module is disposed one on opposite side of the digital down converter than the fine delay module.

13. A method for emulating channel propagation with separation between a propagation model and hardware performing emulation, the method comprising:
   determining a propagation model based on a user selection made at an external controller;
   determining emulation parameters based on the propagation model at a host device in communication with the external controller;
   configuring a radio peripheral with the emulation parameters determined at the host device;
   receiving input radio frequency (RF) data at the radio peripheral; and
   modifying the input RF data according to channel effects including signal delay, propagation loss and Doppler shift effect to generate an RF output representing a modification of the input RF data based on the propagation model,
   wherein the Doppler shift effect includes spreading that is multiplicative in frequency.

14. The method of claim 13, further comprising determining a plurality of propagation models each corresponding to a different path to model a multipath scenario.

15. The method of claim 14, wherein the different propagation models are processed in parallel or in a cascaded fashion.

16. The method of claim 13, wherein the radio peripheral comprises a resampler, and wherein configuring the radio peripheral comprises configuring the resampler to implement a delay to model bandwidth compression associated with relativistic Doppler shift effects to implement the Doppler shift effect to include spreading that is multiplicative in frequency.

17. The method of claim 16, wherein the resampler is configured to produce and consume samples at the sample rate such that a number of samples produced is larger than a number of samples consumed to implement the delay.

18. The method of claim 16, wherein the resampler is configured to employ time dilation of the input RF data in the digital domain.

19. The method of claim 16, wherein the resampler is configured to generate an output having frequency components that are equal to frequency components of an input thereof multiplied by a ratio between output buffer length and input buffer length.

20. The method of claim 16, wherein the resampler includes a Farrow filter.

\* \* \* \* \*

UNITED STATES PATENT AND TRADEMARK OFFICE
CERTIFICATE OF CORRECTION

PATENT NO. : 10,498,470 B1
APPLICATION NO. : 15/610652
DATED : December 3, 2019
INVENTOR(S) : David M. Coleman et al.

Page 1 of 1

It is certified that error appears in the above-identified patent and that said Letters Patent is hereby corrected as shown below:

On the Title Page

Item (72), Inventors, delete "Charleston" and insert therefor --Charles Town--.

Signed and Sealed this
Twenty-first Day of January, 2020

Andrei Iancu
*Director of the United States Patent and Trademark Office*